April 25, 1961 O. K. KELLEY 2,981,122
ACCESSORY DRIVES
Filed Oct. 7, 1953 6 Sheets-Sheet 1

INVENTOR
Oliver K. Kelley
BY
T. L. Chisholm
ATTORNEY

April 25, 1961      O. K. KELLEY      2,981,122
ACCESSORY DRIVES

Filed Oct. 7, 1953      6 Sheets-Sheet 3

INVENTOR
*Oliver K. Kelley*
BY
*T. L. Chisholm*
ATTORNEY

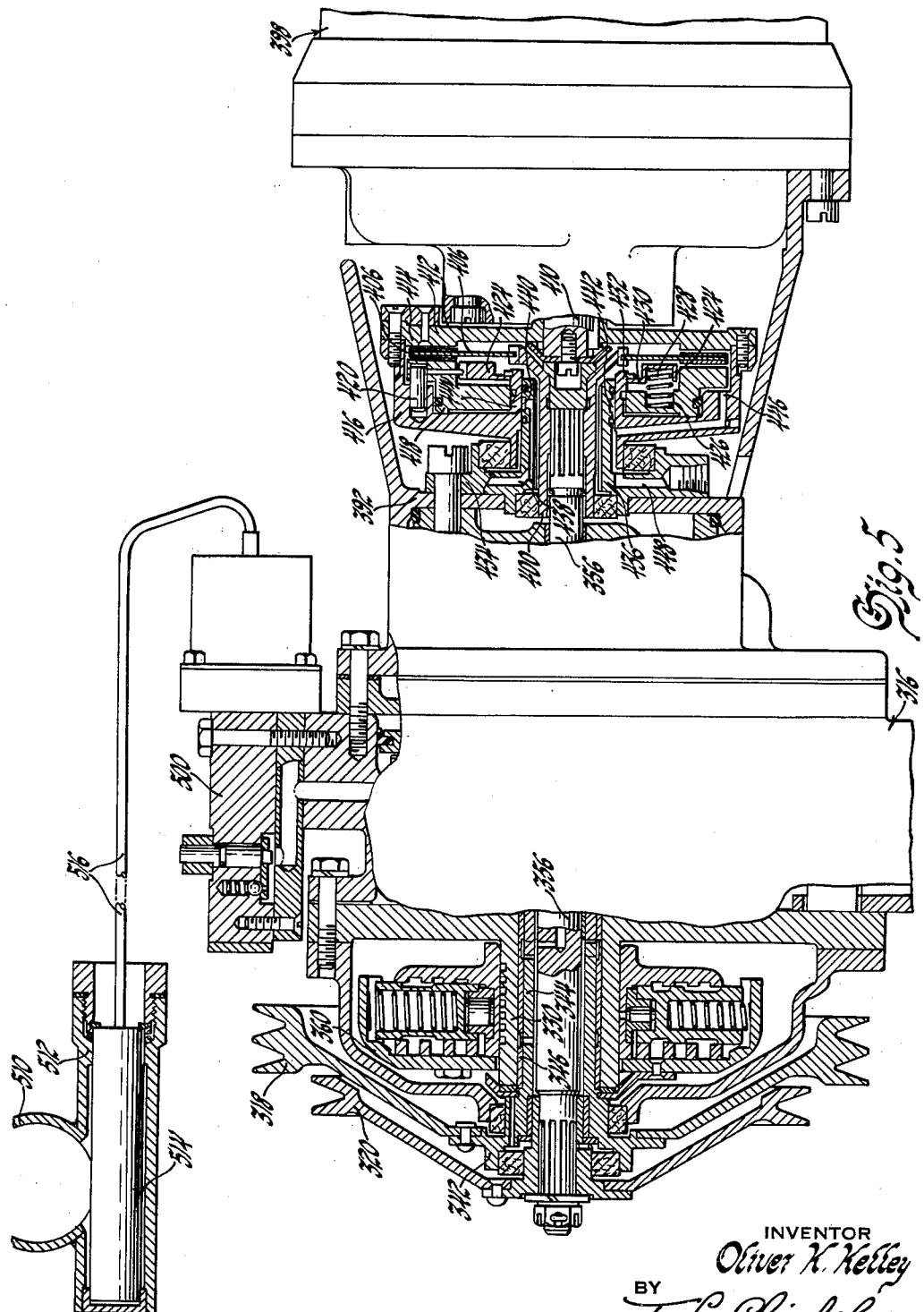

April 25, 1961    O. K. KELLEY    2,981,122
ACCESSORY DRIVES

Filed Oct. 7, 1953    6 Sheets-Sheet 5

INVENTOR
Oliver K. Kelley
BY
T. L. Chisholm
ATTORNEY

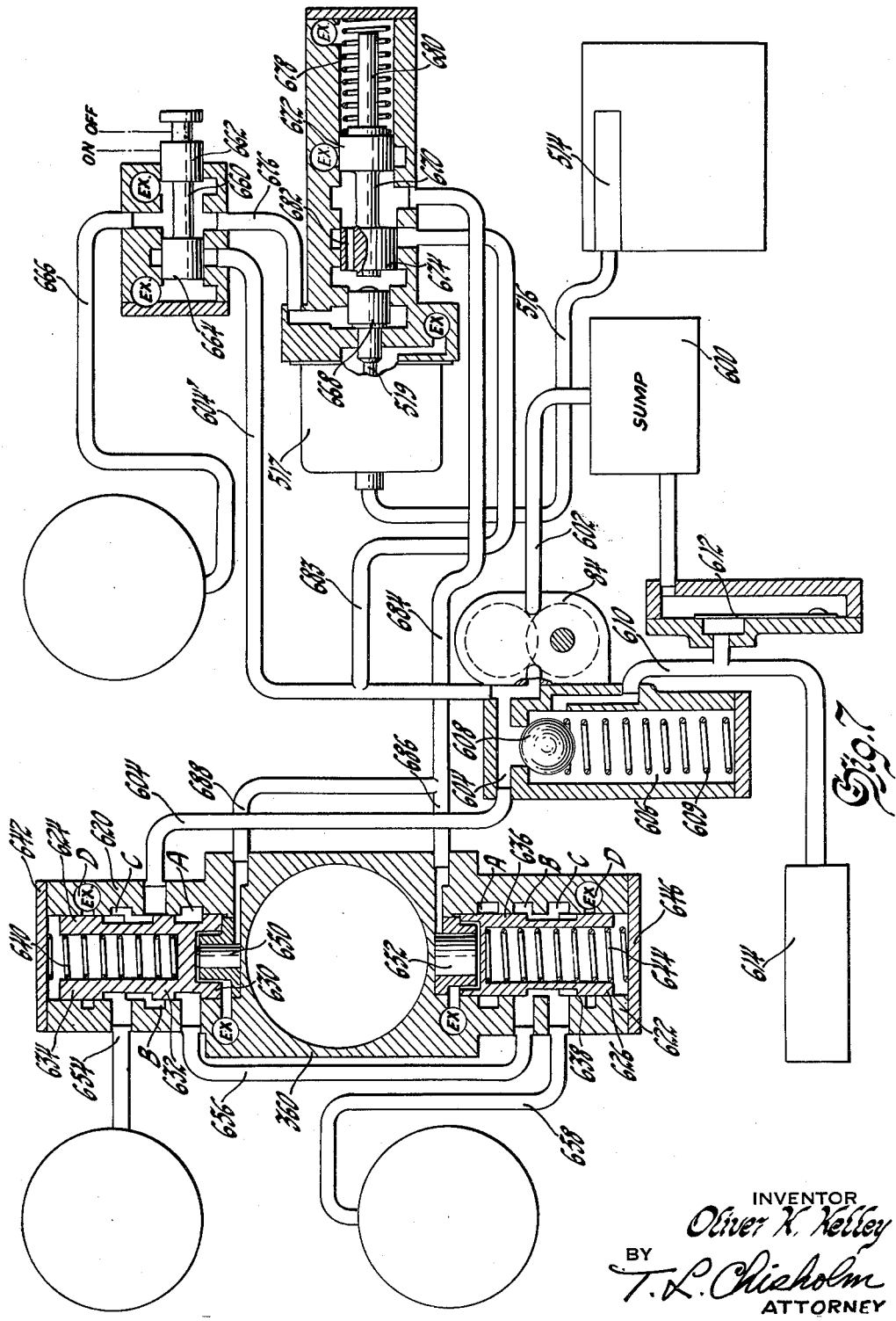

United States Patent Office 2,981,122
Patented Apr. 25, 1961

2,981,122

ACCESSORY DRIVES

Oliver K. Kelley, Birmingham, Mich., assignor to General Motors Corporation, Detroit, Mich., a corporation of Delaware Filed Oct. 7, 1953, Ser. No. 384,665

17 Claims. (Cl. 74—472)

This invention relates to improvements in accessory drives for automotive vehicles and more particularly to transmissions driven by the engine and utilized to drive the engine accessories at predetermined rates of speed relative to the engine speed.

Accessories utilized in connection with automotive vehicles in recent years have become more numerous and, since most of the accessories have been driven directly by the engine at a fixed speed ratio relative thereto, their construction has necessarily been of a character to permit operation over a fairly wide range of speed. The accessories which can be found associated with automotive vehicles in some instances are necessary for the successful operation of the engine itself and in other instances are associated with equipment adding to the comfort or convenience of the vehicle occupant. In the former category may be found the fan for drawing air through the radiator associated with the engine, and the generator serving its usual function. In the latter category are pumps for supplying hydraulic pressure for the operation of steering mechanism, brakes, etc., and mechanism associated with air conditioning systems, such as compressors, condensers receiving cooling air from the engine fan, and the like.

When these accessories are driven directly by the crank shaft of the engine, it follows that the speed of drive of the accessories corresponds to the engine operating range which varies from idling speed to full throttle operation, necessitating construction of the accessories of such nature as to be capable of being operated over comparable ranges. The construction of such accessories can be materially simplified, their efficiency increased, and their operating characteristics considerably improved if the range of speed over which these accessories must be operated can be reduced relative to the speed of rotation range over which the engine operates. Further, if the speed of operation of some of the accessories, such as fans, is varied in accordance with the demand imposed by ambient temperatures, greater overall efficiency can be obtained.

An object of the present invention is to provide a transmission to be driven by the engine for the purpose of driving engine accessories and the like, which transmission can produce a range of speed output which is narrower than the range of engine operation.

Another object of the invention is to provide a transmission driven by the crank shaft of the engine at a fixed speed ratio, which transmission can be automatically operated to provide an output speed range of differing ratios over predetermined operating ranges of the engine.

Another object of the invention is to provide a transmission driven by the crank shaft of the engine at a fixed speed ratio, which transmission is automatically operable to provide an output, the speed of rotation of which is in overdrive relation to the crank shaft speed during a low range of crank shaft speed; which output speed is at another but lower overdrive ratio over another operating range of the engine; and which output speed bears a still further ratio relation to engine speed over a further range of engine operation.

Another object of the invention is to provide an accessory drive transmission which is so driven by the crank shaft of the engine and which is so automatically operable as to provide a range of output speed rotation which is higher than engine speed at idling and which is lower than engine speed at full throttle operation.

A further object of the invention is to provide an accessory drive transmission, including planetary gear arrangements and mechanism for automatically changing the speed ratio of the gear arrangement in such fashion as to provide an output drive of three stages, two of which are overdrive relative to the input speed, and the third of which is direct drive relative thereto.

Another object of the invention is to provide means for varying the change of ratio in the transmission relative to the speed of rotation of the crank shaft of the engine.

Another object of the invention is to provide hydraulic means for varying the shift points for the accessory transmission under the control of the cooling required for the engine or under the control of the load imposed on the accessory transmission.

Another object of the invention is to provide hydraulic governor mechanism for controlling automatically the speed ratio condition of the planetary gearing just described.

A still further object of the invention is to provide, in the gearing connecting the input shaft of the accessories drive transmission with the output shaft thereof, an arrangement whereby the output shaft is coupled for direct drive by the input shaft under any operating condition during which an overdrive relation between these shafts is not maintained.

An additional object of the invention is to provide, in association with the hydraulic governor previously mentioned, an arrangement for supplying liquid under pressure by the governor to the speed control mechanism of the engine whereby idling thereof can be maintained at a level commensurate with the load imposed on the engine through the accessories drive transmission.

In carrying out the foregoing and other objects of the invention, use is made of an accessories drive unit which has an input shaft to be driven directly by the crank shaft of the engine at a fixed speed ratio. The transmission has an output shaft which is adapted to be connected for drive purposes to the input shaft, either through a planetary gear system which can provide two overdrive ratios or through a free wheel clutch which will operate to assure that the output shaft will be driven at least at the same speed of rotation as the input shaft. A hydraulic governor or shift valve mechanism is associated with the input shaft and is operable in such fashion as to control the planetary gear system to operate the same for the purpose of establishing the respective overdrive ratios at predetermined ranges of engine speed. This hydraulic governor mechanism is also operable to supply some measure of control over the throttle opening of the carburetor of the engine so that the engine can be operated with a maintained idling speed even though the load imposed thereupon by the accessories driven by the transmission may be varied. In this fashion adventitious stalling of the engine can be eliminated. The free wheel clutch arrangement interposed between the input shaft and the output shaft serves not only to provide a definite speed ratio for certain speeds, but also serves to assure drive of the output of the accessories transmission even in the event of failure of any part of the hydraulic system used for controlling the planetary gearing. Thus drive of the various accessories is insured under all circumstances.

In a modification of the invention provision is made for obtaining more efficient engine cooling through the agency of a fan operating in conjunction with a radiator whereby the fan is operated at a speed which will fit the requirements under various prevailing temperature conditions. If the fan for the engine is designed to draw the maximum air through the radiator, and also through the condenser of a refrigerating or air conditioning system, it is possible that the fan may be undesirably noisy at low engine speeds. Consequently, provision is made for operating the fan at such speed relative to the engine speed as will cause proper cooling of the medium in the radiator, either under low load conditions or under high load conditions. In this modification of the invention provision is also made for compensating for the load applied to the accessory transmission of an intermittent nature so that a change in ratio in the transmission occurs at most advantageous points in the range of engine speed.

Other features, objects and advantages of the invention will become apparent from the following detailed description of the accompanying drawings in which, Fig. 1 is an end view of an engine with the accessories drive transmission mounted thereon and showing briefly the manner in which certain accessories can be driven thereby;

Fig. 3 is an enlarged view partially in section and partially in elevation of the governor mechanism employed in this invention, such view being taken substantially along the line 3—3 of Fig. 4;

Fig. 4 is a section taken substantially on the line 4—4 of Fig. 3;

Fig. 5 is a view somewhat similar to Fig. 2 of a modification of the invention;

Fig. 7 is a schematic illustration of the hydraulic circuits associated with the apparatus shown in Fig. 5.

Figure 1:
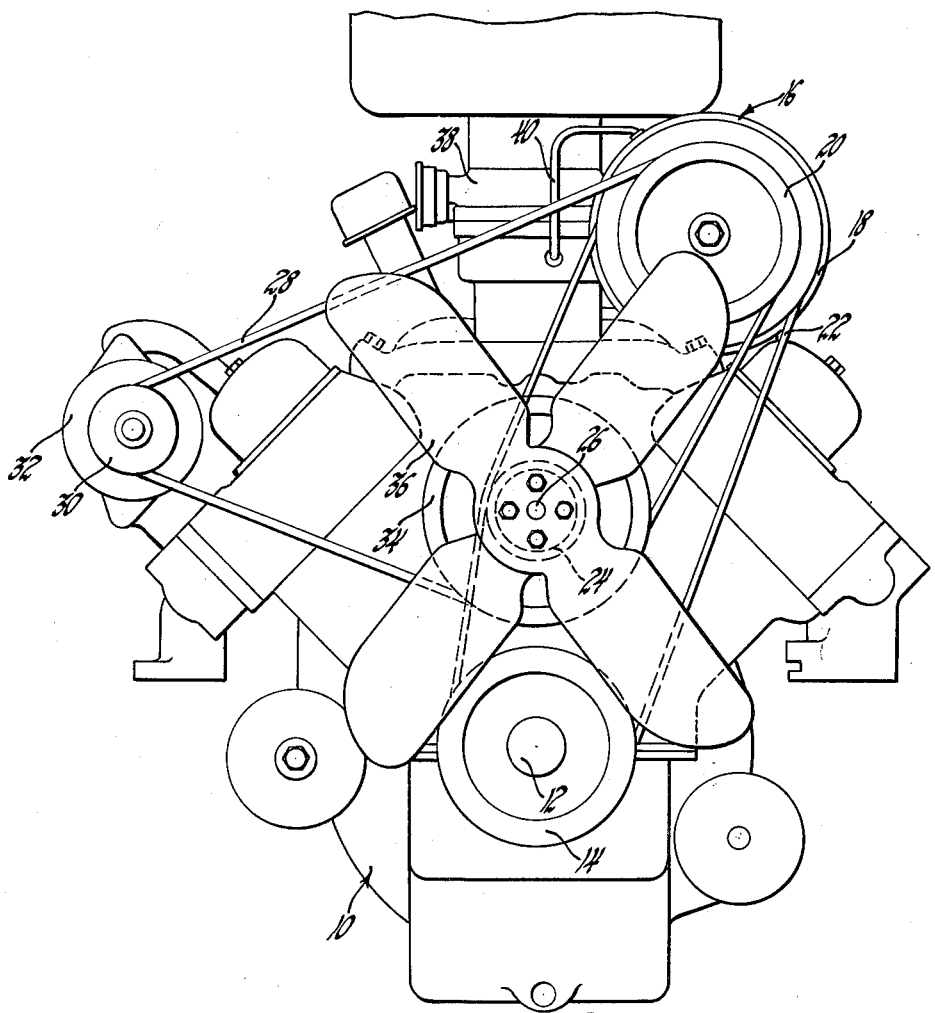
Fig. 1A is a schematic representation of carburetor controls associated with the present invention.

Referring now to the drawings and particularly to Fig. 1, 10 indicates generally an internal combustion engine of a type generally employed in automotive vehicles. The engine is provided with a crank shaft 12 on which is mounted a pulley 14. Secured to the engine near the top thereof in any suitable location is an accessory transmission indicated generally at 16, such transmission being provided with a shaft on which is mounted an input pulley 18. This transmission also has a concentric output pulley 20. The input pulley 18 is driven by the engine crank shaft 12 through the agency of a belt 22 passing over the pulleys 14 and 18, respectively, and over an idler pulley 24 rotatable about a shaft 26 secured in any suitable fashion to the engine block. The output pulley 20 serves to drive, through a belt 28, a pulley 30 secured to the shaft of a conventional generator 32, and a pulley 34 of fan 36 which is rotatable about the shaft 26.

Engine 12 is also provided with a suitable carburetor 38 of any desired construction, and this carburetor has a fluid connection 40 extending therefrom to the transmission 16 for a purpose to be explained later.

Figure 2:
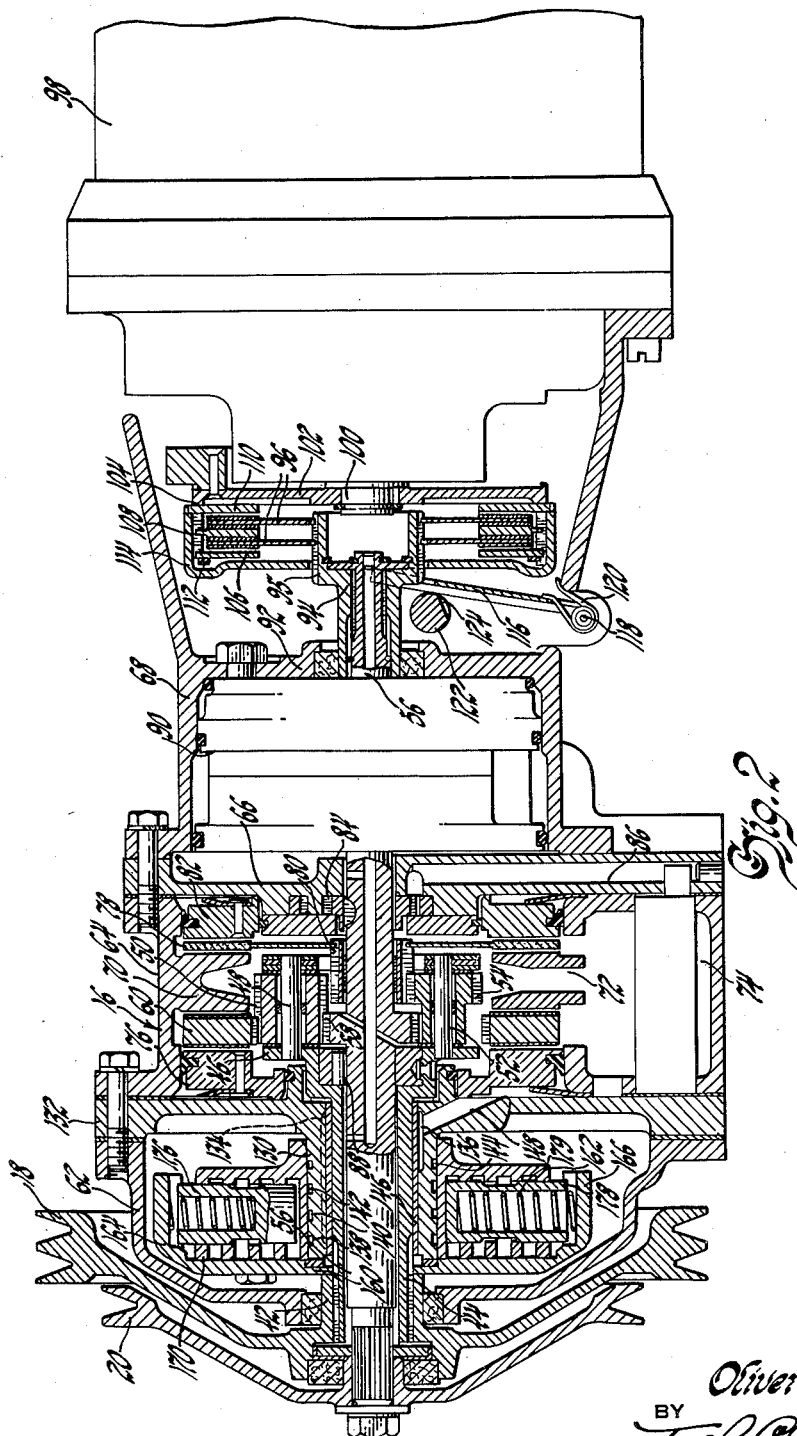
Fig. 2 is a section, partially vertical, through a transmission embodying the invention.

Referring now to Fig. 2, the arrangement of the input and output pulleys 18 and 20 have been shown in more detail. Fig. 2 has a portion thereof through the governor-like shift valve arrangement partially on a vertical angle and partially on an angle of 120° to the vertical, while the section through the planetary gear unit is a true vertical section. The input pulley 18 has the hub 42 thereof splined to a sleeve shaft 44, one end of which is provided with a flange 46 serving as the carrier for the planetary gear unit. Flange 46 has secured thereto a plurality of shafts 48 on which are rotatably mounted pinions 50, hereinafter referred to as long pinions. The carrier also has a plurality of shafts 52 on which are rotatably mounted pinions 54, hereinafter referred to as short pinions. The short pinions 54 are in mesh with part of the long pinions 50.

The output pulley 20 is splined to an output shaft 56 which has a sun gear 58 formed integrally therewith or attached thereto in any suitable manner. In mesh with the long pinions 50 are a ring gear 60, and also sun gear 58.

It will be noted by reference to Fig. 2 that the housing of the transmission is made up of several parts connected together, such parts being represented at 62 for enclosing the centrifugal shift valves, at 64 for enclosing the planetary gear unit and at 66 and 68 for adidtional purposes to be explained later. The part 64 is provided with a clutch anchor member 70 of ring-like shape, with a part thereof cut away as at 72 to permit fluid to pass therethrough into the sump 74 provided in the casing. The ring gear 60 has one surface thereof confronting a part of anchor 70 and has associated therewith a piston 76 movable under liquid pressure to lock the ring gear 60 to the anchor for preventing rotation of this gear. Another clutch member 78 confronts another part of the anchor 70 and is extended to be splined to a second sun gear 80 in mesh with the short pinions 54 and freely rotatable about output shaft 56. Associated with the clutch member 78 is a piston 82, adapted to be moved under liquid pressure to lock the clutch member against the anchor 70 and thereby to lock the sun gear 80 against rotation relative to the housing.

Secured to the output shaft 56 is a pump 84 which may be of any well-known gear type, such pump drawing liquid from the sump 74 through the passage 86 and discharging the liquid through an outlet, not shown, for use in connection with the functioning of the planetary gear unit and also for other purposes.

The input sleeve shaft 44 is concentrically positioned relative to the output shaft 56, and a one-way free wheeling clutch 88 is positioned between the output shaft 56 and a step in the planet carrier formed integrally with the sleeve shaft 44. This one-way brake permits the output shaft to rotate faster than the input shaft, but functions to compel rotation of the output shaft at least at the same speed as the input shaft.

A further accessory for use in connection with a vehicle has been indicated at 90 as constituting the housing for a liquid pump which may be used for any of several purposes, such as an aid in power steering or in power brakes. The particular pump forms no part of the invention but constitutes only a further accessory which must be driven by the engine for its successful operation. It will be noted that the output shaft 56 extends through the casing of this pump and is used to drive the same. The output shaft 56 extends through a wall 92 extending across the part 68 of the housing and has splined thereto a sleeve 94, enlarged and splined at 95 externally to support clutch plates 96.

A further accessory, such as the compressor for a cooling system for cooling the interior of the vehicle, is indicated generally at 98 and this compressor is provided with a drive shaft 100. Secured to the drive shaft 100 is a disk-like member 102 having an annular flange 104. A plurality of clutch plates 106, 108 and 110 have their peripheries notched to fit in slots cut in the flange 104. These clutch plates cooperate with the plates 96 to impart drive from the output shaft 56 to the shaft 100 of the compressor. The plates can be engaged in the following manner: Plate 106 serves as anchor plate of the assembly, being restrained against movement to the left by a snap ring 112 fitting in a groove in the flange 104. The plate 110 serves as the pressure plate and, as shown in the drawings, ports thereof extend through the slots in the flange 104 and are secured to a cup-like member 114 so that movement of this member 114 can cause engagement or release of the clutch plates. Such movement of the member 114 is caused by an actuating arm 116 pivotally mounted as at 118 and biased for movement to the left, as viewed in the drawings, by the spring 120. Manual control of the clutch is accomplished through the clutch rod 122 which has a flat 124 on a part thereof. Rotation of this rod by the operator of the vehicle can be accomplished by any suitable linkage. When the rod 122 has been moved to the position shown in Fig. 2, such movement forces the control member 116 to rotate about its pivot, thereby moving member 114 to the right, relieving engaging pressure. When the rod 122 is moved to bring the flat 124 into register with the actuating member 116, the spring 120 applies such pressure as to move member 116 and, consequently, member 114 to the left, engaging the cooperating plates with sufficient spring pressure to hold the plates together and thereby to transmit rotation from shaft 56 to shaft 100.

The valves controlling operation of the mechanism are enclosed within the part of the housing indicated at 62. Referring particularly to Figs. 2 and 3, it will be seen that a stationary sleeve member 130 has a ribbed flange part 132 bolted between the parts 60 and 62 of the housing. The inner surface of the sleeve 130 is provided with four axial grooves of different lengths, two of said grooves being shown at 134 and 136. The respective grooves are connected each to one of four peripheral channels 138, 140, 142 and 144. A bushing 146 is fitted with a pressed fit within the bore of the sleeve 130 to make a liquid-tight joint therewith and to complete the longitudinal channels. Each of these channels in the sleeve 130 is connected with an oil line for the purposes of accomplishing the aims of this invention. For example, the channel 136 is connected with an oil line or passage 148 extending to the chamber behind piston 76. Groove 144 is in communication with channel 136 and hence oil passing from this groove will be directed to the piston 76. Another channel 134 communicates with a line 150, to which is connected the line 40 of Fig. 1 which extends to the carburetor of the engine. A third channel 152 is connected to a line 154 supplied with oil by the pump 84. A fourth channel 156 is connected to a line 158 which extends to supply oil to the right-hand side of piston 82. These various lines 148, 150, 154 and 158 may be drilled in the body of the flange 132 or may be in the form of separate pipe lines if more convenient.

Rotatable about the periphery of the sleeve 130 is a valve body made up of a disk 160 and a bossed member 162 secured to the disk. The disk is centrally apertured and provided with splines fitting the splines on the sleeve shaft 44 so that the valve body rotates with this sleeve shaft. Disk 160 is provided with three angular extending fingers 164, 166, and 168 in register with the bosses of the member 162. The bosses which are indicated at 170, 172 and 174 are spaced apart approximately 120° and are of such size as to be bored out to receive sliding valve members 176, 178 and 180. Each of these valve members, as shown, is provided with an intermediate portion of reduced diameter whereby inner and outer lands are created. Each valve member has enclosed within the bore thereof a spring shown at 177, 179 and 182, and each member is bored to a different depth so that the weight of each thereof is different. Valve member 180 is internally bored to the shortest depth and hence is influenced earliest by centrifugal force. Valve member 176 is of intermediate weight while member 178 is the lightest of the three. Each of the hollowed-out bosses is provided with ports designated respectively A, B, C and D for each boss.

The hub of member 162 is provided with four spaced channels 200, 202, 204 and 206. These channels have substantially radial passages communicating therewith as indicated at 201, 203, 205 and 207. These respective passages are spaced apart axially of the hub to register individually with grooves 138, 140, 142 and 144 for the proper flow of oil in the circuit. Channel 200 has a passage 208 extending to port D of the boss 174. Port C of this boss in turn has a passage 210 connected to the channel 206. Channel 200 also has a passage 212 connected to port B of boss 172, while port C of that boss is connected by passage 214 to port C of boss 170. Port B of the latter boss is connected by passage 216 to the channel 202. Port D of boss 170 is connected by passage 218 to the channel 204. The ports of these bosses not otherwise connected as just described are connected to exhaust so that fluid can be relieved therefrom. Since the composite valve body rotates with the sleeve shaft 44 which is the input shaft of this accessory transmission, it follows that the three valve members will be influenced by the centrifugal force created by rotation of the valve body and that, due to the difference in weight of these valves and the calibration of the springs associated with each thereof, the valves will move outwardly as the result of different rotative speeds.

Oil seals are located wherever necessary throughout the mechanism and have not been identified or described in detail since the use thereof is well known. Likewise, oil channels and passages for lubrication have been shown but not described.

The operation of the transmission and its associated parts is substantially as follows: As soon as the engine 10 is started, rotation of the crank shaft thereof will cause rotation of the input pulley 18 and consequently of the sleeve shaft 44 and planetary carrier 46. In the absence of oil pressure, which must be delivered by pump 84, the clutches including pistons 76 and 82 are released and, therefore, the gears in mesh with the pinions carried by the carrier are free to rotate or else the pinions themselves will rotate without transmitting torque. However, the one-way clutch 88 forces output shaft 56 to rotate simultaneously with the input shaft, and such action continues until the pump 84 delivers pressure. This will occur as soon as, or before, the engine reaches idling speed. The delivered oil is introduced by the line 154 to the groove 152 and thence through the passage 201 in the rotating hub of the valve body to the channel 200 therein. From this channel the oil will pass through line 208 to port D of the boss 174, at which point it will be arrested by the outer land of valve 180 and will remain arrested as long as this valve is in its retracted position as urged by the spring 182. Simultaneously, oil from channel 200 proceeds by passage 212 to port B of boss 172, which port is in communication with port C of the same boss due to valve 178 also being in retracted position. From port C of boss 178 the oil proceeds by passage 214 to port C of boss 170 which, when the valve 176 is retracted as shown, is in communication with the port B of the same boss and the latter port is connected by line 216 to the channel 202 which is connected by the radial bore 203 to the proper groove in the periphery of sleeve 130 communicating with the axial channel 136 which in turn is in communication with the first piston 76 through line 148. It follows, therefore, that as soon as, or before, the engine has reached idling speed oil will be supplied to engage the clutch controlled by piston 76 which locks the ring gear 60 against rotation by forcing the same against the anchor member 70. When this ring gear is locked against rotation it serves as the reaction member for the planetary unit, with the result that as planet carrier 46 rotates, the long pinions 50 will walk around the ring gear 60 and drive the sun gear 58, and hence the output shaft 56, at a faster rate than that of rotation of the input shaft 44 and the carrier 46. The ratios between the gears can be so determined as to obtain the desired overdrive of the output shaft relative to the input shaft.

Thus at relatively low engine speed and hence low input speed of the accessory transmission the output shaft of this transmission will rotate at a higher rate, driving the fan 36 and the shaft of generator 32 at a speed in excess of engine speed. The exact ratio between engine speed and speed of rotation of these accessories depends not only on the gear ratio in the planetary unit, but also on the ratio between the pulleys 14 and 18. Examples of these ratios will be set forth hereinafter. While mention has just been made of the fan and generator, it will be obvious that simultaneously the accessory pump 90 will be driven and, if the clutch associated with the compressor 98 has been manually engaged, this compressor also will be driven.

The oil circuit has just been described in connection with the front or first overdrive clutch, but it should be noted that another control takes place at engine idling speed. For example, if the desired idling speed is approximately 400 r.p.m. of the engine, the weight of valve 180 and the calibration of spring 182 biasing the same are so predetermined that at this desired speed of engine rotation valve 180 will be moved outwardly to its full permissible extent under centrifugal force. When such movement occurs, port D of boss 174 is placed in communication with port C thereof by the outer land of valve 180 uncovering port D so that oil supplied to port D immediately passes from the boss through line 210 to channel 206 and thence through radial opening 207 to the axial channel 134 communicating with line 150. From line 150 the oil passes through the pipe line 40 to the carburetor 38 of the engine, at which location it can exert a control force. For example, if the carburetor is provided with a spring control therein which normally tends to increase the idling speed of the engine, this supplied oil can be operated in opposition to the spring to prevent the engine from exceeding its desired idling condition. If the load on the accessory transmission should be increased, for example, by applying the clutch for the compressor 98, such increased load on the transmission will be communicated to the engine, tending to reduce the idling speed thereof. If this speed is unduly reduced, centrifugal force will not be sufficient to overcome spring 182 so that this spring will move the valve 180 inwardly to a point at which the outer land thereof closes port D of boss 174, cutting off the supply of oil to the carburetor, whereupon the spring will be free to increase the idling speed of the engine until the valve 180 is again moved outwardly. In this manner regulation of the idling of the engine can be accomplished regardless of the load imposed on the accessory transmission.

Figure 1A:
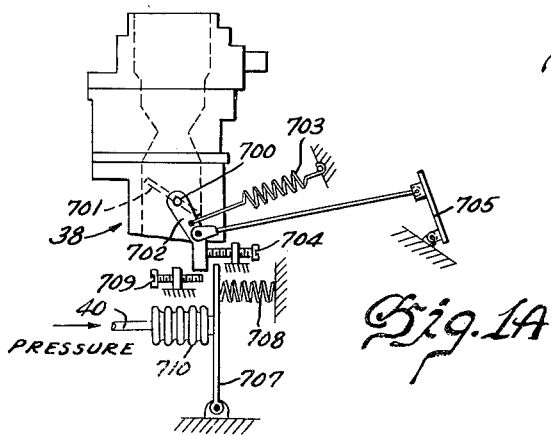

The foregoing carburetor control is shown schematically in Fig. 1A wherein the carburetor 38 has rotatably mounted across a passage thereof a shaft 700 to which is fixedly secured the throttle valve 701. Also fixedly secured to shaft 700 is arm 702 moved to the right, as viewed in the drawing, by the return spring 703 to abut against an adjustable stop 704. The arm 702 is connected to the accelerator pedal 705 by a link 706. It will be noted that the adjustable stop 704 serves to determine low speed idling of the engine. Pivotally secured to a part of the carburetor mount is an arm 707 which extends into the path of movement of the lower arm 702. Arm 707 is biased to the left by spring 708 which is strong enough to overcome spring 703. An adjustable stop 709 is positioned, as shown, to limit movement of arm 707 under the action of spring 708. A bellows 710 is supplied with fluid under pressure by the line 40 previously described. In operation the mechanism just described is adjusted as follows: with supply of fluid under pressure interrupted to the bellows 710, the adjustable stop member 709 is adjusted to cause the engine to have an idling speed of, for example, 1000 r.p.m. When oil is permitted to reach the bellows 710, arm 707 is moved against spring 708 and then the stop 704 can be adjusted to give a low engine operating speed of, for example, 450 or 500 r.p.m. If load is imposed on the accessory drive as previously mentioned, oil is evacuated from the bellows 710 whereupon the spring 708 causes arm 707 to move arm 702 to further open the throttle valve 701. This causes high idling of the engine and will continue until pressure is restored by line 40 to bellows 710.

As the engine is accelerated, centrifugal force on the valves becomes greater until an engine speed is reached at which time the weight of the valve 176 plus centrifugal force will be sufficient to overcome the spring 177 associated therewith, whereupon this valve will move outwardly to its full extent. Upon such movement the inner land of valve 176 closes port B of boss 170, thereby cutting off the supply of oil to line 216, channel 202, radial passage 203, axial channel 138 and passage 148 to the chamber of piston 76. This chamber is then permitted to exhaust, but simultaneously movement of the valve 176 outwardly has established communication between port C of boss 170 and port D thereof so that oil supplied to port C will continue through line 218 to the channel 204, radial passage 205, axial passage 156 and line 158 which extends to the chamber of the rear clutch piston 82. Oil supplied against this piston moves it to the left, locking plate 78 against anchor 70 and thereby locking the sun gear 80 against rotation. Under this condition the sun gear 80 serves as the reaction member for the planetary unit so that rotation of carrier 46 causes the short pinions 54 to walk around sun gear 80 and, since these short pinions are in mesh with long pinions 50, rotation will be imparted to the long pinions and by them communicated to the sun gear 58 and the output shaft 56. The ratios of the gears are such that the sun gear 58 rotates faster than the carrier, but a slower speed than when the ring gear 60 furnishes reaction. The second or rear clutch therefore establishes a second overdrive ratio.

When the engine accelerates to a speed at which centrifugal force acting on valve 178 overcomes the spring 179 associated therewith, this valve is moved outwardly immediately closing port B of boss 172, cutting off the supply of oil from the pump so that the rear clutch no longer receives this supply and, in fact, is exhausted by the communication established in boss 172 between the ports C and D thereof, the port D being connected to exhaust. With the rear clutch disengaged, the planetary unit becomes ineffective to transmit torque, with the result that the driven shaft 56 slows down until the one-way clutch 88 becomes effective, at which time the drive is direct, i.e., the input shaft 44 and the output shaft 56 rotate in unison. This condition will prevail until the speed of the input shaft drops below the predetermined direct drive speed, at which time centrifugal force will not be sufficient to overcome the spring 179 associated with valve 178, and this spring will reestablish the second overdrive ratio. Further deceleration of the engine will establish the first overdrive ratio.

A more comprehensive understanding of the relations existing between the engine crank shaft and the output of the accessory drive will be gained by an illustrative example of the ratios involved. For example, the gearing embodied in the planetary unit may be such that in first overdrive ratio the ratio between input and output shafts of the transmission may be 1:3 while the ratio in second overdrive condition will be approximately 1:1.73. The third ratio is 1:1. At the same time the pulleys connected to the crank shaft and to the input of the accessory drive may be so determined that the input of the accessory drive rotates at .8 the speed of the engine crank shaft. With these ratios existing it follows that if the engine is idling at 400 r.p.m. the accessory drive will have an input speed of 320 r.p.m. and an output speed of 960 r.p.m. This condition prevails as long as the transmission remains in first overdrive ratio. The weighed valves utilized in the governor arrangement, and the springs associated therewith, can be so proportioned that a shift is made from first overdrive ratio to second overdrive ratio at about 800 r.p.m. of the engine. When this shift occurs the result will be that for a speed of 800 engine r.p.m. the accessory transmission will have an input speed of approximately 640 r.p.m. and an output speed of approximately 1128 r.p.m. This condition will prevail until the engine reaches a speed at which it is desirable to shift to direct drive, which may occur at approximately 1800 engine r.p.m. At this point the transmission will have an input speed of 1440 r.p.m. and an output speed also of 1440 r.p.m. The 1:1 ratio will continue at all engine speeds above the shift point, which is predetermined.

The above examples are for the purpose simply of illustrating the manner in which the transmission may be operated to have an output range which is considerably narrower than the full range of engine operation. From these examples it will be noted that with an engine range of from 400 r.p.m. to 4000 r.p.m. the accessory drive will have an output range of from 960 r.p.m. to 3200 r.p.m.

Another advantage existent in the present mechanism is the arrangement whereby transmission drive is assured even though there should be a failure in the hydraulic system associated therewith. Since the input and output shafts are effectively coupled by a free wheel clutch, it follows that the output shaft must always rotate at least at the same speed as the input shaft so that if the hydraulic controls should cease to function for any reason whatsoever, drive of the accessories at a fixed ratio relative to the engine crank shaft is compelled.

The embodiment shown in Fig. 5 is for the major part similar to that shown in Fig. 2, and hence certain portions thereof have been omitted from the drawings. This accessory drive has an input pulley 318 connected to a hub member 342 of the input shaft 344. The input shaft 344 extends into the housing 316 having the planetary gear unit therewithin which corresponds in all details to the gear unit shown in Fig. 2. Also within the housing shown in block diagram is the pump for supplying hydraulic pressure to supply the transmission and the pump which can be used for power steering or power brake purposes. The output shaft 356 corresponds to output shaft 56 of the first embodiment and has the output pulley 320 secured to the outer end thereof for rotation therewith.

The compressor 398 can have the drive thereof established from the output shaft 356 through the agency of a hydraulically operated and hydraulically controlled clutch instead of the manual clutch shown in Fig. 2. A sleeve member 400 is splined to the end of shaft 356 and has an angularly extending branch 402, the periphery of which is provided with splines 404 engaged by splines of a clutch disk 406. The drive shaft 410 of the compressor has secured thereto a disk member 412 provided near the periphery thereof with a portion 414 to cooperate with an outer portion of the clutch plate 406. Secured to the disk 412 is a piston housing 416 within which is mounted a piston 418 having a part thereof shaped to engage the outer part of the clutch plate 406 and to compress this plate between a surface of the piston and the surface 414. Rotation of piston 418 with the housing 416 is compelled by a number of pins 420 seated in recesses in the housing and in the piston. The piston also has seated therein radial pins 422 which make sliding engagement with the periphery of a plurality of cups 424, the openings of which are in register with openings 426 in the piston. Springs 428 are positioned in these openings and serve to cause relative separation of the piston and cups; the cups having motion to the right limited by extensions 430 engaging a snap ring 432.

A disk-like member 434 is secured to the partition wall 392 and has an axially extending sleeve part 436 about which the hub of the piston housing 416 may revolve. An oil channel 438 is drilled in the disk 434 and its extension 436 and this channel has a radial continuation 440 in communication with a peripheral groove 442. Oil in this groove can pass through the channel 444 into the interior of the piston housing to the left of the piston 418 to move this piston to the right as viewed in the drawing. It will be noted that oil seals are provided advantageously throughout this clutch structure, and detailed description thereof has been omitted since they may be employed wherever desired.

Since the piston housing will rotate with the disk 412 secured to the drive shaft of the compressor whenever such is being rotated and, since oil may leak around various seals, provision has been made for relieving any oil pressure in the outer part of the piston housing, which pressure might be built up by centrifugal force sufficiently to retard rapid release of the clutch. Thus, a passage 446 extending longitudinally of the piston housing near the outer edge of the piston is extended inwardly into the space between the piston hub and the extension member 436, from which space it may be drained through the passage 448. The passage 438 previously mentioned can be connected to the hydraulic control apparatus to be supplied with liquid under pressure whenever it is desired to engage this clutch. Oil entering this passage 438 will proceed through the axial passage 440 into the peripheral groove 442, and thence through the passage 444 into the piston housing to exert force against the piston 418. Such force is sufficient to move the piston to the right, compressing the clutch disk 406 between the piston face and the part 414 of the disk member 412. Since the clutch plate 406 rotates with the output shaft, it follows that engagement of this clutch causes drive of the compressor drive shaft. When liquid being supplied through the channel 438 is cut off from the source of pressure, the springs 428 expand causing separation of the piston and the cups 424, thereby to release the clutch and to permit the clutch plate 406 to rotate freely between the piston and the part 414. The manner in which the clutch is hydraulically controlled will be explained in detail in connection with Fig. 6.

The centrifugally operated valves associated with this embodiment are substantially in conformity with those previously described, but are two in number instead of three. In addition, provision is made for increasing or changing the action of centrifugal force on the moving valve members so that the point at which a shift in the speed ratio of the transmission occurs can be changed to accommodate conditions of load and temperature. As in the previous embodiment of the invention, use is made of a stationary sleeve member 330 having a plurality of peripheral grooves in register with passages in the hub of the rotating valve body. The sleeve member 330 also has in press fit therewith a bushing 346 which serves to seal against leakage a number of axial channels cut in the inner surface of sleeve 330 in the manner previously described, with such channels in communication respectively with certain of the sleeve's peripheral grooves and also in communication with operating parts of the mechanism. To simplify the illustration, various channels and passages have not been illustrated since the size of the drawings renders the same very difficult of execution. However, it is believed that the principle involved in the operation of the mechanism will be clearly understood from the description of Fig. 7, and that one skilled in the art can very readily provide the necessary fluid passages.

Unlike the previous embodiment of the invention, use is made in this form thereof of a valve body 500 (Fig. 5) having control valves therein for hydraulic operation, such body being mounted on the top of the part 316 of the transmission housing. An additional factor involved in the operation of this embodiment of the invention consists in a control of the transmission in response to change of temperature of the radiator discharge line. This discharge line has been shown in part at 510 in the drawing and has in communication therewith a receptacle 512 in which is mounted a thermostatic element, or temperature sensing bulb, 514 which has a conduit 516 extending to the valve body 500. A thermostatic expansion valve is located within the body 500 at the end of the conduit 516.

The hydraulic circuits for associated equipment have been shown in schematic fashion in Fig. 7. In this figure the pump 84, which supplies liquid under pressure to operate the transmission, is also utilized for the control of the compressor clutch and further for the control of the points at which changes in transmission ratio are made under various temperature and load conditions. Referring to Fig. 7, it will be seen that the pump draws liquid, such as oil, from the sump 600 by way of a passage 602. Oil delivered by the pump passes into a main line 604 having regulator valve 606 in association therewith, which valve comprises a ball 608 working against a spring 609. When the pressure delivered by the pump exceeds the desired working pressure, the ball 608 is unseated, permitting exhaust of some of the liquid directly into the sump and some thereof through a line 610 shunted by a regulator valve 612, which line 610 leads to a gallery 614 for distribution throughout the mechanism for lubrication purposes. For example, the lubricator valve 606 may be calibrated to maintain a main line pressure of 70 lbs. per square inch, while the lubricating regulator valve 612 is calibrated to maintain a pressure of 5 lbs. per square inch. The latter regulator valve discharges into the pump suction line, with any excess being permitted to drain into the transmission housing.

The shift valve body 360, which is splined to the input shaft 344 is shown as having a pair of opposite bosses 620 and 622 which are bored out to provide slideways for valve members 624 and 626, respectively. These bosses are provided with ports A, B, C and D as in the bosses described in connection with Fig. 3, and the valve 624 is provided with lands 630, 632 and 634. Valve 626 is provided with lands 636 and 638. Valve 624 is provided internally with a spring 640, one end of which rests against stop 642. A similar spring 644 is positioned within the valve 626 with one end resting against a stop 646. Slidably mounted in the bosses 620 and 622 are plugs 650 and 652. These plugs are of different diameter and are for the purpose of assisting centrifugal force in overcoming the respective springs 640 and 644.

The main line 604 is extended to the port B of boss 620 to supply fluid under regulated pressure to the valve 624. A line 654 extends from port C of boss 620 to the first speed brake element or the first clutch piston 76 associated with the planetary unit. Another line 656 extends from port A of boss 620 to port B of boss 622, and a further line 658 extends from port C of this latter boss to the second speed brake element or piston 82 (Fig. 2) associated with the planetary unit. Parts of the bosses and certain ports thereof are connected to exhaust as indicated by the letters EX.

The valve body 500 mentioned in connection with Fig. 5 has incorporated therein a slideway for a valve 660 which has two lands, 662 and 664. This body is also ported for a connection to a branch line 604' from the main line 604 whereby fluid under pump pressure can be delivered to the valve 660. An additional port in the body has connected thereto a line 666 which extends to the compressor clutch, i.e., to the piston 418 described in connection with Fig. 5.

The valve body 500 is hollowed out to provide a slideway for a stepped relay valve 668 and for another valve 670 having lands 672 and 674. A line 676 parallel to line 666 leads to ports adjacent the relay valve 668 which is so dimensioned that liquid supplied by this line will impinge upon a surface of one of the steps of this valve. A spring 678 of predetermined strength is positioned around a stem 680 of the valve 670 and is biased to move this entire valve to the left until such movement is arrested by contact with the right-hand end of the valve 668. A longitudinal port 682 extends through the land part 674 of the valve 670 for a purpose to be described later.

It will be noted that the slideway of valve 670 is provided with ports, one of which has connected thereto a line 683 connected to the line 604'. Another port has connected thereto line 684 which extends to the rotating shift valve structure, being branched at 686 and 688 to supply liquid to the inner ends of the plugs 652 and 650, respectively.

The thermostatic element 514 is shown in position in a block representing a passage for water leaving the radiator associated with the engine, and the conduit 516 is illustrated as being connected to the thermostatic expansion valve 517 which has therein a movable plunger 519. The end of this plunger 519 normally bears against one end of the relay valve 668 in its left-most position.

This modification of the invention has been designed for the purpose of obtaining most efficient cooling action by the fan which draws air through the radiator and through a condenser for the equipment served by compressor 398 with a maximum reduction of fan noise at engine speeds during which such noise would be objectionable.

*First condition*

For example, if the engine is idling or the vehicle is moving at low engine speed, should the accessory transmission be operating in the first overdrive ratio the fan would be rotating at a relatively high rate of speed and, depending on the pitch of the fan blades and the size thereof, fan noise may become undesirable. Conquently, this embodiment of the invention makes possible drive of the fan at a lower speed during conditions of ambient temperature which make higher fan speeds unnecessary. To accomplish this purpose, use is made of hydraulic pressure for advancing the points at which a shift from first overdrive ratio to second overdrive ratio relative to engine speed and consequently, accessory input shaft speed.

Assuming that the valve 660 is in the position shown in Fig. 7, the compressor clutch will be released and its load thereby removed from the output shaft of the accessory drive transmission. The land 664 closes the port connected to supply line 604' while the land 662 uncovers a port connected to exhaust so that any liquid which may have been supplied to the compressor clutch is exhausted therefrom. However, liquid under pump pressure is supplied by the line 682 to the valve 670 which is normally moved to the left by the spring 678 to permit land 674 to open the port connected to line 682. As before mentioned, the pump pressure is regulated to a constant 70 lbs. per square inch pressure, and for successful operation of this mechanism the spring 678 is calibrated to apply a pressure to the valve 670 of approximately 35 lbs. per square inch. With these variations in pressure it follows that liquid entering the body between lands 672 and 674 can immediately pass through the port 682 to the left-hand end of valve 670, there to apply pressure to this valve in opposition to spring 678. This valve serves as a modulating valve to permit fluid to pass from the body through line 684 at a pressure of approximately 35 lbs. per square inch, which pressure is supplied to the plugs 650 and 652.

When the centrifugal shift valves are stationary they assume the position shown in Fig. 7, but as soon as the transmission begins rotation concurrent with engine rotation, these valves are subject to centrifugal force. As explained in the first embodiment of the invention, the output shaft of the transmission is compelled to rotate at least at the same speed as the input shaft due to the roller clutch 88. Consequently, when transmission drive is initiated, the output shaft begins driving pump 84 which immediately supplies regulated pressure to the line 604 and from it to the port B of boss 620 from which it passes between lands 632 and 634 of valve 624 to port C and thence through line 654 to the first speed brake element or piston 76. This immediately brakes the ring gear 60 which serves as a reaction element, causing the output shaft to be driven in first overdrive ratio, i.e., at a rate of 3:1 relative to the input shaft speed. Simultaneously, oil under regulated pressure is supplied through line 604 and line 682 to the valve 670 which acts to modulate regulated pump pressure and to deliver a modulated pressure through line 684 to the branches 686 and 688. Modulated pressure acting on the plug 650 serves to combat the resistance of spring 640 and, even at low engine speed, this modulated pressure plus centrifugal force on the valve 624 will be sufficient to cause this valve to move outwardly against stop 642. When this occurs land 632 of valve 624 blocks the port C of boss 620, cutting off supply of oil utilized to maintain the first overdrive clutch in braking or engaged condition. As soon as lnd 632 has cut off supply of oil to the first speed brake element it opens communication between ports B and A of boss 620, permitting pump regulated pressure to pass through line 656 to port B of boss 622 and between the lands of valve 626 to port C and thence to the second speed brake element or piston 82. Engagement of this brake locks the sun gear 80 to ground so that it serves as the reaction element for the planetary unit, establishing second overdrive ratio. The before-described action takes place almost instantaneous with the starting of the engine so that as the engine idles or even is driven at a low rate of speed, the accessory drive operates in the second overdrive ratio instead of in the first ratio so that the fan, instead of being driven at a speed ratio of 3:1 relative to the input shaft speed, is driven at a ratio of approximately 1.73:1, so that with the accessory input shaft rotating at .8 the speed of rotation of the engine crank shaft, the fan will rotate at approximately 1.41 times engine speed. This difference in speeds will not be sufficient to cause the fan to be unduly noisy.

As the engine continues to accelerate a point will be reached at which modulated pressure acting on plug 652 will combine with centrifugal force to move valve 626 outwardly against stop 642, whereupon the land 636 closes port B of boss 622, cutting off supply of oil to the second speed brake element and permitting it to become exhausted via port D. When this occurs the output shaft is no longer compelled to rotate at an overdrive ratio and slows down until the roller clutch 88 compels it to rotate at the same speed as the input shaft. With the parts proportioned as shown and with pressures in the range previously described, such shift occurs at approximately 825 r.p.m. of accessory input shaft speed or approximately 1030 engine r.p.m.

The condition just described will prevail as long as the temperature of the water passing from the radiator to the engine is at a temperature low enough to insure good engine cooling.

Second condition

Figure 6:
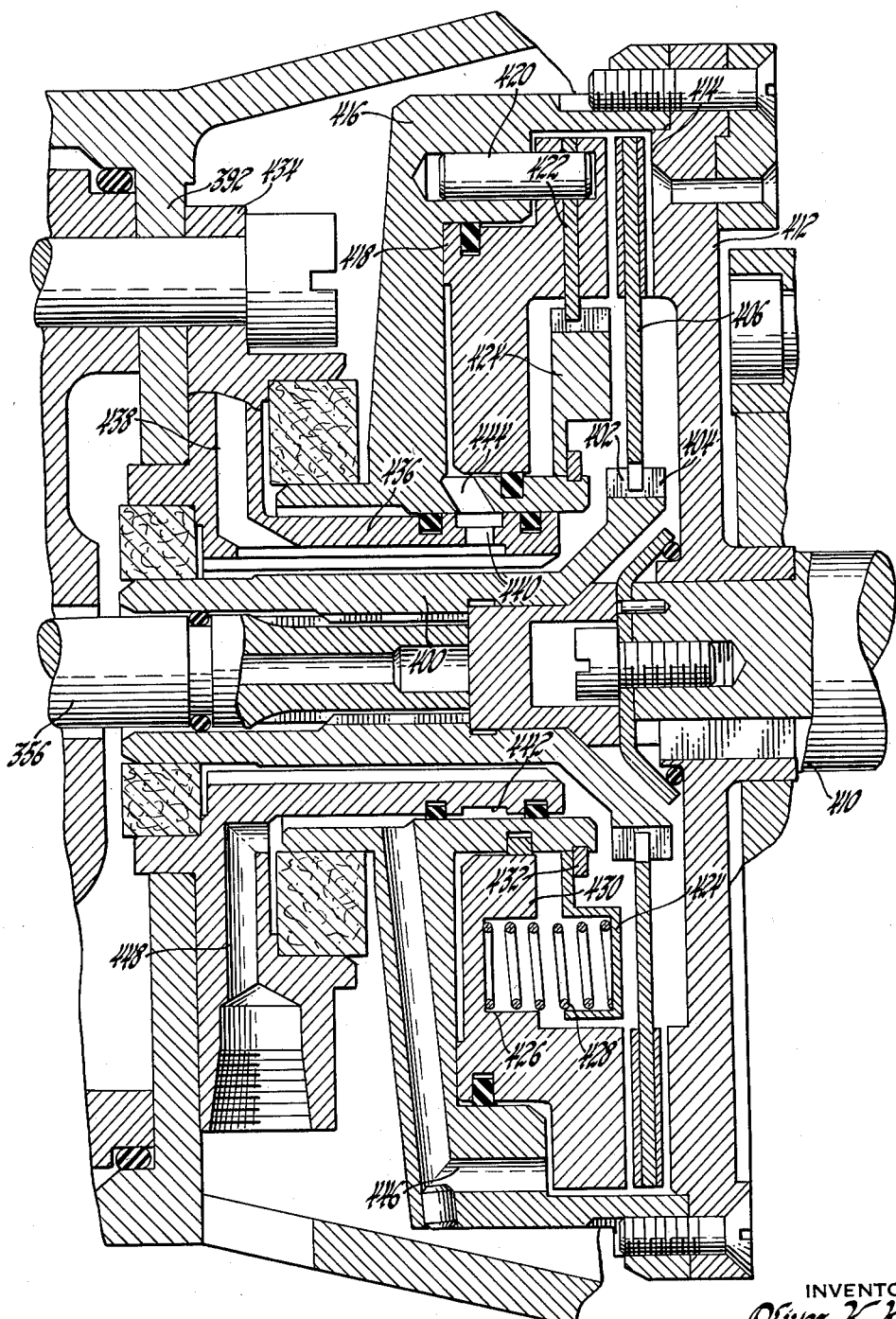
Fig. 6 is an enlarged vertical section through the compressor clutch of Fig. 5.

Assuming that the ambient temperatures under which the car is operating are as just described, but that refrigeration or air-conditioning is desired, which will involve the cooling of a condenser by the fan in addition to radiator cooling, the refrigeration apparatus can be activated by movement of the manual valve 660 through suitable linkage from the position shown in Fig. 6, to the left. This movement will cause the land 664 to uncover the port connected to supply line 604', with the result that oil under pump pressure is immediately supplied to the compressor clutch described in connection with Fig. 5. Oil supplied to the piston 418 of this clutch causes the same to connect the drive shaft of the compressor for rotation with the output shaft of the accessory transmission. Simultaneously, oil passes through port 676 into the bore of the body having valves 670 and 668 therein, at which location the oil is active against the first step of valve 668, moving it to the right into contact with the end of valve 670. This added pressure serves to cause the pressure modulated by valve 670 and delivered through line 684 to be reduced, for example, to a pressure of 15 lbs. per square inch. Reduction in the modulated pressure, which is used only for changing the shift points of the accessory transmission by action on the plugs 650 and 652, will change the points at which the transmission will have its ratio between input shaft and output shaft varied. For example, with the plugs dimensioned approximately as shown and with fluid pressure of about 15 lbs. per square inch, the accessory transmission will remain in first overdrive ratio at all engine speeds up to 462 r.p.m. of the input shaft thereof. This speed corresponds to an engine speed of 578 r.p.m. and thus the range includes idling and drive of the vehicle at a low speed.

Shift from first overdrive ratio to second overdrive ratio will occur approximately at 462 r.p.m. of the accessory transmission input shaft and will continue over a range extending to approximately 1120 r.p.m. of the input shaft (1400 engine r.p.m.), at which point the transmission will be shifted from second overdrive ratio to direct drive ratio through the agency of the one-way roller clutch.

Third condition

Should the water being delivered from the radiator to the engine attain a predetermined high temperature, the action thereof on the temperature sensing bulb 514 will cause the thermostatic motor 517 to function, moving the protruding pin 519 thereof to the right (Fig. 7), which motion will move the stepped valve 668 and the valve 670 to the right to the extent determined by the length of the projection 680. When such movement occurs, the land 674 of valve 670 closes the port connected to supply line 682 so that modulated output from this valve immediately ceases, and the plugs 650 and 652 are no longer activated to assist centrifugal force in moving the shift valves 624 and 626 outwardly. Under this condition the accessory transmission will operate in first overdrive ratio up to a speed of approximately 570 r.p.m. of the accessory drive input shaft which corresponds to a speed of 715 engine r.p.m. Shift from first to second overdrive ratios will occur at this point in the manner previously described and will be maintained over a range extending to approximately 1315 accessory drive input shaft r.p.m., corresponding to 1650 engine r.p.m. At this point the accessory drive transmission will be shifted into direct drive through the agency of the overrunning roller clutch, which ratio will be continued at all speeds above the shift point.

The operation just described takes place whenever the temperature of the water being supplied to the engine is high enough to indicate the need for further cooling by the fan and will occur whether the refrigeration compressor is being operated or not. Furthermore, it will be obvious that operation under any of the three conditions just described can occur during any phase of car operation so that speed of accessory drive can be determined to meet requirements dictated by temperature or by load on the accessory drive output.

What is claimed is:

1. In combination, an engine having an output shaft and having fuel supply mechanism, and an accessory drive transmission, said transmission comprising a driving shaft and a driven shaft, means driven by said output shaft for driving said driving shaft at a fixed speed ratio, change speed ratio gearing between said driving and driven shafts, and governor means responsive to speed of rotation of said driving shaft for automatically changing the ratio between driving and driven shafts at predetermined rotative speeds of said driving shaft, said governor means controlling the supply of hydraulic force to said fuel supply mechanism.

2. In combination, an engine having an output shaft and having fuel supply mechanism, and an accessory drive transmission, said transmission comprising a driving shaft and a driven shaft, means driven by said output shaft for driving said driving shaft at a fixed speed ratio, change speed ratio gearing between said driving and driven shafts, and hydraulic governor means responsive to speed of rotation of said driving shaft for automatically changing the ratio between driving and driven shafts at predetermined rotative speeds of said driving shaft, said hydraulic governor means being operative in a low range of driving shaft speed to supply hydraulic force to said fuel supply mechanism.

3. In combination, an engine having an output shaft and having hydraulically influenced fuel supply mechanism, and an accessory drive transmission, said transmission comprising a driving shaft and a driven shaft, means driven by said output shaft for driving said driving shaft at a fixed speed ratio, change speed ratio gearing between said driving and driven shafts, a pair of hydraulically operated friction engaging device for controlling said gearing and hydraulic governor means responsive to speed of rotation of said driving shaft for automatically operating said friction engaging devices to change the speed ratio between driving and driven shafts at predetermined rotative speeds of said driving shaft, said governor being operative below a predetermined speed of rotation of said driving shaft to supply hydraulic force to said fuel supply mechanism.

4. An accesssory drive transmission for an engine, said transmission comprising a drive shaft to be actuated by said engine at a fixed speed ratio and a driven shaft for actuating engine accessories, a planetary gear system interposed between said driving and driven shafts, said gear system including a sun gear rotating with said driven shaft, a planet carrier rotating with said driving shaft, said carrier having a pair of sets of pinions mounted thereon, the pinions of one set being in mesh with those of the other set, the pinions of one set being in mesh with said sun gear, and a pair of reaction gears in mesh respectively with said sets of pinions, individual hydraulic locking devices for said reaction gears, hydraulic governor means driven by said driving shaft for selectively operating said devices to lock said reaction gears against rotation thereby to cause said carrier and the pinions mounted thereon to rotate said sun gear and said driven shaft at different speed ratios higher than the speed of rotation of said carrier and said driving shaft, and one-way brake means for causing rotation of said driven shaft at the speed of rotation of said driving shaft when both of said reaction gears are released.

5. In combination, an engine having a hydraulically influenced fuel supply mechanism, and an accessories drive transmission, said transmission comprising a drive shaft actuated by said engine at a fixed speed ratio and a driven shaft for actuating engine accessories, a planetary gear system interposed between said driving and driven shafts, said gear system including a sun gear rotating with said driven shaft, a planet carrier rotating with said driving shaft, said carrier having a pair of sets of pinions mounted thereon, the pinions of one set being in mesh with those of the other set, the pinions of one set being in mesh with said sun gear, and a pair of reaction gears in mesh respectively with said sets of pinions, individual hydraulic locking devices for said reaction gears, hydraulic governor means driven by said driving shaft for selectively operating said devices to lock said reaction gears against rotation thereby to cause said carrier and the pinions mounted thereon to rotate said sun gear and said driven shaft at different speed ratios higher than the speed of rotation of said carrier and said driving shaft, and one way brake means for causing rotation of said driven shaft at the speed of rotation of said driving shaft when both of said reaction gears are released, said governor being operative below a predetermined speed of rotation of said driving shaft to supply hydraulic force to said fuel supply mechanism.

6. An accessory drive transmission for an engine, said transmission comprising a driving shaft to be actuated by said engine, and a driven shaft for actuating engine accessories, means interposed between said driving and driven shaft for automatically varying the relative rates of rotation thereof over a plurality of predetermined ranges of driving shaft speed of rotation, and temperature controlled means for changing the range of driven shaft speeds relative to the range of driving shaft speeds.

7. An accessory drive transmission for an engine, said transmission comprising a driving shaft to be actuated by said engine, and a driven shaft for actuating engine accessories, means interposed between said driving and driven shafts and controlled by speed of rotation of said driving shaft for automatically varying the relative rates of rotation thereof over a plurality of predetermined ranges of driving shaft speed of rotation, and temperature controlled means for varying the points in the range of speed of said driving shaft at which the relative rates of rotation between driving and driven shafts are changed.

8. An accessory drive transmission for an engine, said transmission comprising a driving shaft to be actuated by said engine, and a driven shaft for actuating engine accessories, means interposed between said driving and driven shafts and controlled by speed of rotation of said driving shaft for automatically varying the relative rates of rotation thereof over predetermined ranges of driving shaft speed of rotation, and means controlled by load on said driven shaft for varying the points in the range of speed of said driving shaft at which the relative rates of rotation between driving and driven shafts are changed.

9. An accessory drive transmission for an engine, said transmission comprising a driving shaft to be actuated by said engine, and a driven shaft for actuating engine accessories, means interposed between said driving and driven shafts for automatically varying the relative rates of rotation thereof over a plurality of predetermined ranges of driving shaft speed of rotation, said driven shaft rotating at higher speed ratios than said driving shaft in certain of said ranges, and at the same speed in another range, and temperature controlled means for varying the points in the range of speed of said driving shaft at which the relative rates of rotation between driving and driven shafts are changed.

10. An accessory drive transmission for an engine, said transmission comprising a driving shaft to be actuated by said engine, and a driven shaft for actuating engine accessories, planetary gear means having input and output elements and a plurality of reaction elements, said means being interposed between said driving and driven shafts for automatically varying the relative rates of rotation thereof over a plurality of predetermined ranges of driving shaft speed of rotation and for maintaining a ratio for a predetermined range of driving shaft speed, said driven shaft rotating at higher speed ratios than said driving shaft in certain of said ranges, and at the same speed in another range, and means controlled by load on said driven shaft for varying the points in the range of speed of said driving shaft at which the relative rates of rotation between driving and driven shafts are changed.

11. An accessory drive transmission for an engine having an output shaft, said transmission comprising a driving shaft and a driven shaft, means driven by said output shaft for driving said driving shaft at a fixed speed ratio, change speed ratio gearing between said driving and driven shafts, governor means responsive to speed of rotation of said driving shaft for automatically changing the ratio between driving and driven shafts at a plurality of predetermined rotative speeds of said driving shaft and for maintaining a ratio for a predetermined range of driving shaft speed, and hydraulic means controlled by load on said driven shaft for varying the action of said governor means to vary the points in the speed of rotation of said driving shaft at which changes in the ratios between driving and driven shafts occur.

12. An accessory drive transmission for an engine having an output shaft, said transmission comprising a driving shaft and a driven shaft, means driven by said output shaft for driving said driving shaft at a fixed speed ratio, change speed ratio gearing between said driving and driven shafts, governor means responsive to speed of rotation of said driving shaft for automatically changing the ratio between driving and driven shafts at predetermined rotative speeds of said driving shaft, and temperature controlled hydraulic means for varying the action of said governor means to vary the points in the speed of rotation of said driving shaft at which changes in the ratios between driving and driven shafts occur.

13. An accessory drive transmission for an engine having an output shaft, said transmission comprising a driving shaft and a driven shaft, means driven by said output shaft for driving said driving shaft at a fixed speed ratio, change speed ratio gearing between said driving and driven shafts, means responsive to speed of rotation of said driving shaft for automatically changing the ratio between driving and driven shafts at a plurality of predetermined rotative speeds of said driving shaft and for maintaining a ratio for a predetermined range of driving shaft speed, and means for varying the response of said last mentioned means thereby to cause automatic changing of said ratio at different predetermined rotative speeds of said driving shaft.

14. An accessory drive transmission for an engine having an output shaft, said transmission comprising a driving shaft and a driven shaft, means driven by said output shaft for driving said driving shaft at a fixed speed ratio, change speed ratio gearing between said driving and driven shafts, means responsive to speed of rotation of said driving shaft for automatically changing the ratio between driving and driven shafts at predetermined rotative speeds of said driving shaft, and heat controlled means for varying the response of said last mentioned means thereby to cause automatic changing of said ratio at different predetermined rotative speeds of said driving shaft.

15. An accessory drive transmission for an engine having an output shaft, said transmission comprising a driving shaft and a driven shaft, means driven by said output shaft for driving said driving shaft at a fixed speed ratio, change speed ratio gearing between said driving and driven shafts, means responsive to speed of rotation of said driving shaft for automatically changing the ratio between driving and driven shafts at a plurality of predetermined rotative speeds of said driving shaft and for maintaining a ratio for a predetermined range of driving shaft speed, and means controlled by load on said driven shaft for varying the response of said last mentioned means thereby to cause automatic changing of said ratio at different predetermined rotative speeds of said driving shaft.

16. In combination, an engine having cooling medium supplied thereto and having an output shaft, an accessory drive transmission, accessories to be driven by said transmission, said transmission comprising a driving shaft and a driven shaft, means driven by said output shaft for driving said driving shaft at a fixed speed ratio, change speed multi step ratio gearing between said driving and driven shafts, means responsive to speed of rotation of said driving shaft for automatically changing the ratio between driving and driven shafts at predetermined rotative speeds of said driving shaft, and means controlled by the temperature of said cooling medium for varying the response of said last mentioned means thereby to cause automatic changing of said ratio at different predetermined rotative speeds of said driving shaft.

17. In combination, an engine having cooling medium supplied thereto and having an output shaft, an accessory drive transmission, accessories to be driven by said transmission, said transmission comprising a driving shaft and a driven shaft, means driven by said output shaft for driving said driving shaft at a fixed speed ratio, change speed multi step ratio gearing between said driving and driven shafts, means responsive to speed of rotation of said driving shaft for automatically changing the ratio between driving and driven shafts at a plurality of predetermined rotative speeds of said driving shaft and for maintaining a ratio for a predetermined range of driving shaft speed, and means controlled by the load imposed on said driven shaft by an accessory for varying the response of said last mentioned means thereby to cause automatic changing of said ratio at different predetermined rotative speeds of said driving shaft.

References Cited in the file of this patent

UNITED STATES PATENTS

| | | |
|---|---|---|
| 782,547 | Coffee | Feb. 14, 1905 |
| 1,997,575 | Cummins | Apr. 16, 1935 |
| 1,997,682 | Emery | Apr. 16, 1935 |
| 2,027,819 | Gregg | Jan. 14, 1936 |
| 2,071,428 | Prince | Feb. 23, 1937 |
| 2,079,724 | Van Ranst | May 11, 1937 |
| 2,088,954 | Gregg | Aug. 3, 1937 |
| 2,173,661 | Perrine | Sept. 19, 1939 |
| 2,214,335 | Kurti | Sept. 10, 1940 |
| 2,269,916 | Price | Jan. 13, 1942 |
| 2,370,484 | Nabstedt | Feb. 27, 1945 |
| 2,464,088 | Jandasek | Mar. 8, 1949 |
| 2,467,077 | Brunken | Apr. 12, 1949 |
| 2,567,042 | Wemp | Sept. 4, 1951 |
| 2,630,893 | Misch et al. | Mar. 10, 1953 |
| 2,651,949 | Barnes | Sept. 15, 1953 |
| 2,652,816 | Dodge | Sept. 22, 1953 |
| 2,688,886 | Flynn | Sept. 14, 1954 |
| 2,717,524 | Davis | Sept. 13, 1955 |